(12) United States Patent
Greeley

(10) Patent No.: US 6,758,325 B2
(45) Date of Patent: Jul. 6, 2004

(54) TROLLEY-TYPE MONORAIL CONVEYOR SYSTEM

(76) Inventor: Robert Greeley, 241 Edgeley Blvd., Units 9 & 10, Concord, Ontario (CA), L4K 3Y6

( * ) Notice: Subject to any disclaimer, the term of this patent is extended or adjusted under 35 U.S.C. 154(b) by 191 days.

(21) Appl. No.: 10/120,138

(22) Filed: Apr. 11, 2002

(65) Prior Publication Data

US 2002/0185031 A1 Dec. 12, 2002

(51) Int. Cl.$^7$ ............................................. B65G 17/32
(52) U.S. Cl. .................................. 198/687.1; 198/465.4
(58) Field of Search ........................... 198/465.4, 678.1, 198/687.1, 687, 685, 683; 104/84, 93, 106, 110, 172.4

(56) References Cited

U.S. PATENT DOCUMENTS

| | | | |
|---|---|---|---|
| 3,064,584 A | | 11/1962 | Zebarth |
| 3,064,585 A | | 11/1962 | Ewing, Jr. |
| 3,134,481 A | * | 5/1964 | Maimin ............... 198/687.1 X |
| 3,164,245 A | * | 1/1965 | Juengel ............... 198/465.4 X |
| 3,184,042 A | * | 5/1965 | Rutkovsky et al. .. 198/687.1 X |
| 3,244,293 A | | 4/1966 | Stahmer |
| 3,352,252 A | | 11/1967 | Bertolini |
| 3,624,774 A | * | 11/1971 | Marietta, Jr. ......... 198/465.4 X |
| 4,114,539 A | | 9/1978 | Deno |
| 4,991,517 A | | 2/1991 | Lotzer |
| 5,014,864 A | | 5/1991 | Richter et al. |
| 5,141,094 A | * | 8/1992 | Speckhart et al. ... 198/678.1 X |
| 5,255,610 A | | 10/1993 | Enderlein |
| 5,653,172 A | | 8/1997 | Roschier |
| 6,138,574 A | | 10/2000 | Zaguroli, Jr. |

FOREIGN PATENT DOCUMENTS

| | | |
|---|---|---|
| DE | 197 21 726 | 7/1998 |
| EP | 0 164 109 | 12/1985 |
| EP | 0 534 077 | 3/1993 |
| GB | 2 261 202 | 5/1993 |

* cited by examiner

*Primary Examiner*—James R. Bidwell
(74) *Attorney, Agent, or Firm*—Riches, McKenzie & Herbert LLP

(57) ABSTRACT

A conveyor system includes an elongate track or rail and a number of trolleys used to store and/or convey various items along the track or rail. In cross-section, the rail is generally crescent shaped with a hollow interior, having an upwardly convex upper surface and an upwardly concave lower surface. The trolleys consist of an elongated trolley bar or support suspended on one or more trolley pendants which movably engage and travel along the rail. The trolley pendants are generally U-shaped having a central bight or body to which the trolley bar is coupled, and two spaced apart arms which project from the bight. The arms of the trolley pendant are spaced from each other by a distance selected greater than the lateral width of the rail. The arms of the trolley pendant define a throat portion between the arms. A bearing member is spaced towards the end of each arm, projecting inwardly towards each other part way into the throat. The bearing members are spaced from each other by a minimum distance which is selected less than the lateral extent of the rail, but greater than the maximum spacing in between the upper and lower rail surfaces.

21 Claims, 3 Drawing Sheets

TROLLEY-TYPE MONORAIL CONVEYOR SYSTEM

SCOPE OF THE INVENTION

The present invention relates to a ceiling or floor mounted conveyor system and, more particularly, a trolley-type monorail conveyor system which is suitable for use in the garment, manufacturing, retail or import industries, as well as dry-cleaning establishments and small factories.

BACKGROUND OF THE INVENTION

Garment monorail systems are well known for use in conveying garments in the manufacturing, retail and dry-cleaning industries. Conventional systems typically are of a monorail-type design, in which a track or rail is formed into a closed loop by joining sections of V-shaped steel angle iron or cylindrical bars suspended from the ceiling. A number of wheeled trolleys used to convey garments suspended on hangers are movable along the upper surface of the rail. In use, the trolleys are mounted to the rail so that the trolley body is suspended directly beneath the rail, with the wheels engaging and movable along the upper rail surface.

A major disadvantage of conventional conveyor systems exists in that it is both difficult and time consuming to customize the rail and trolley configurations for installation at a particular site. In particular, many dry-cleaning businesses are established in small commercial premises or kiosks housed within other retail establishments. This frequently necessitates the customization of the conveyor system to fit within smaller spaces and to maximize the number of garments which may be stored and conveyed by the system.

The use of rails formed from cylindrical tubes has been found to be advantageous, as the tubular construction provides strength and enables the rail to be easily bent on-site to fit within a specific space configuration. Where cylindrical rails are used, however, the individual trolleys must be placed on and removed from the rail by physically separating rail sections. Typically, rail sections are separated either by the partial disassembly of the rail, or by including specialized rail pieces which swing apart to form gaps in the rail, and enable the trolleys to be removed or added to the conveyor system.

To avoid the difficulties associated with removing and adding trolleys from cylindrical rail systems, various conveyor systems incorporate a rail formed from lengths of angle iron which is bent in an upwardly pointed V-shape. By manufacturing the trolley with a U-shape and a sufficient throat depth, it has been found that the individual trolleys may be slid onto the V-shaped rail without requiring time consuming track disassembly, or the added expense of including customized rail sections. V-shaped rails, however, do not possess the same strength as conventional cylindrical rail designs. To provide the rail with sufficient load carrying capabilities, it therefore is necessary to form the rail sections from 0.25 inch thick or greater steel. This in turn increases the overall weight and material expense of the conveyor system.

In addition, conveyor systems which incorporate a rail made from lengths of V-shaped angle iron are poorly suited for customization. In particular, because of its V-shape, angle iron is poorly suited for bending and on-site customization. As such, V-shaped rail systems frequently require the production of specialized components for installation as corner bends, or as rise or drop-run pieces.

SUMMARY OF THE INVENTION

The present invention seeks to overcome at least some of the disadvantages of the prior art conveyor systems by including a rail or track in a conveyor system having the workability and strength of conventional cylindrical rails, and which permits simplified placement and removal of trolley members or pendants from the rail. The rail is generally crescent shaped in cross-section and is characterized as a hollow generally tubular construction having a generally upwardly curving or convexly upward upper surface, and an upwardly dimpled or concave lower surface.

Another object of the invention is to provide a conveyor system adapted for installation in a monorail-type configuration and which permits simplified manufacturing and on-site customization of the conveyor track or rail.

A further object of the invention is to provide a monorail-type conveyor system having a hollow rail along which one or more trolleys move, and which achieves substantially the same or greater strength as conventional cylindrical rails, while permitting simplified installation and removal of the trolleys without requiring disassembly of the rail.

The present invention provides a conveyor system which includes an elongated track or rail and a number of trolleys used to store and/or convey various items along the rail, such as garments, manufactured goods, components or livestock. The conveyor system is configured for customized installation in smaller commercial establishments where, for example, the rail is provided in a longitudinally extending continuous loop. In cross-section the rail is preferably generally crescent shaped with a hollow interior. Most preferably, the rail is formed by crimping the bottom edge of a cylindrical metal tube along its longitudinal length to provide the rail with an upwardly convex upper surface which extends to an uppermost crest or ridge, and an upwardly dimpled and most preferably concave lower surface. Further, the hollow interior of the rail enables the rail to be bent or formed into a continuous loop in the same manner and with corresponding strength as with cylindrical rail constructions.

Where the conveyor system is to be used in dry-cleaning establishments or the like, the rail preferably has a lateral width selected at between about 10 and 60 mm and, most preferably, about 20 and 30 mm. The lower surface is crimped so that a preferred maximum spacing of about 10 and 20 mm exists between the convex upper and concave lower surfaces. Larger or smaller rail configurations, however, remain possible depending on the goods to be conveyed.

The trolleys preferably consist of an elongated trolley bar, loop or other support which is suspended on one or more trolley pendants which movably engage and travel along the rail. The trolley bar is formed having sufficient size and rigidity to support the articles which are to be moved by the conveyor system.

The trolley pendants are generally U-shaped having a central bight or body to which the trolley bar is coupled, and two spaced apart arms which project from the bight. Most preferably, the bight includes a hook, threaded bore, bolt or other keeping member which is used to releasably retain the trolley bar. The arms of the trolley pendant are spaced from each other by a distance which is selected greater than the lateral width of the rail and define a throat portion therebetween. A bearing member such as a sled, wheel, glide or the like is spaced towards the end of each arm. The bearing members project inwardly towards each other part way into the throat, and are spaced from each other by a minimum distance which is selected less than the lateral extent of the rail, but greater than the maximum spacing in between the upper and lower rail surfaces. More preferably, the arms of the trolley pendants extend from the base generally parallel to each other and project a distance from the body such that the length of the throat portion between the bight and the bearing members is at least as long as the lateral width of the rail.

Preferably, each end of the trolley bar is secured to a respective trolley pendant. More preferably, the rod, hook or other bar keeper member which extends from the bight of each respective trolley pendant and is inserted through a corresponding complimentary sized bore or slot formed through the trolley bar adjacent each of its ends. A secondary coupling bore hole or slot formed through the trolley bar adjacent one or both of its ends is sized to releasably receive part of the rod, hook or keeper member from an adjacent trolley pendant used to coupled to and support the proximate end of the adjacent trolley bar, so as to link the trolleys together in movement along the conveyor rail.

In assembly, a number of identical trolley pendants are mounted on the rail for longitudinal movement therealong with the bearing members resting on the convex upper rail surface, and the trolley body suspended directly beneath the rail. It has been appreciated that providing the rail with the upwardly concave lower surface permits the trolley pendants to be positioned on or removed from the rail in essentially the same manner as with V-shaped angle iron rail systems.

The keepers of adjacent pairs of trolley pendants are inserted through the complimentary sized bores of the trolley bar, thereby coupling the trolley bar to an associated pair of trolley pendants. The hooked end of the trolley pendant keeper member used to support a first end of the trolley bar is inserted into the secondary coupling slot or bore hole formed in the proximate end of the next adjacent trolley bar, thereby linking the trolleys together in movement along the rail.

When the trolleys approach a curve or bend in the rail, the trolleys are simply temporarily unhooked by removing the keeper member from the secondary slot or bore, allowing each trolley to independently move across the bend, after which they may again be recoupled to each other.

Accordingly, in one aspect, the present invention resides in a conveyor system comprising, a longitudinally elongated rail and a pendant-type trolley member for movement along the rail, the rail being generally tubular and having an upwardly convex upper surface extending to an uppermost crest, and an upwardly concave lower surface spaced a distance from said upper surface, the trolley member comprising a body and pair of spaced apart arm members extending upwardly from said body for placement along each side of said track, each arm member including a bearing member for engaging said upper surface on opposite sides of said crest to movably support the trolley member on said track, said bearing members being separated from each other by a minimum distance selected greater than the maximum distance said lower surface is spaced from said upper surface.

In another aspect, the present invention resides in a ceiling mounted conveyor system comprising, a longitudinal elongated hollow track and at least one paid of trolley member for movement longitudinally along the track, the track having a generally upwardly convex upper surface extending to an uppermost crest, and an upwardly concave lower surface spaced a distance from said upper surface, with the track being symmetrical about a vertically extending plane extending longitudinally through said crest, each trolley member including a body adapted for suspension directly below said track and a pair of spaced apart arm members extending upwardly from said body for placement on each side of said track, each arm member including a bearing member for engaging said upper surface on opposite sides of said crest to movably support the trolley member on said track, said bearing members being separated from each other by a minimum distance selected greater than a maximum distance said lower surface is spaced from said upper surface, and a plurality of vertical support members coupled to of said track proximate said crest, said support members having a lateral width selected less than the minimum distance separating said bearing members.

In a further aspect, the present invention resides in a conveyor system comprising, a longitudinally elongated rail, said rail having an upwardly convex upper surface extending to an uppermost crest, and an upwardly concave lower surface spaced a distance from said upper surface, a pair of trolley pendants, each of said trolley pendants comprising a body and pair of spaced apart arm members extending upwardly from said body for placement along each side of said rail, each arm member including a bearing member for engaging said upper surface on opposite sides of said crest to movably support the trolley pendant on said track, said bearing members being separated from each other by a minimum distance selected greater than the distance said lower surface is spaced from said upper surface, a first keeper member releasably coupled to a first one of said pair of trolley pendants, a second keeper member releasably coupled to the second other one of said pair of trolley pendants, and a trolley bar adapted for coupling with said first and second keeper members for associated movement with said pair of trolley pendants.

BRIEF DESCRIPTIONS OF THE DRAWINGS

Further objects and advantages will now appear from the following detailed description, together with the accompanying drawings in which.

DETAILED DESCRIPTION OF THE DRAWINGS

Figure 1:
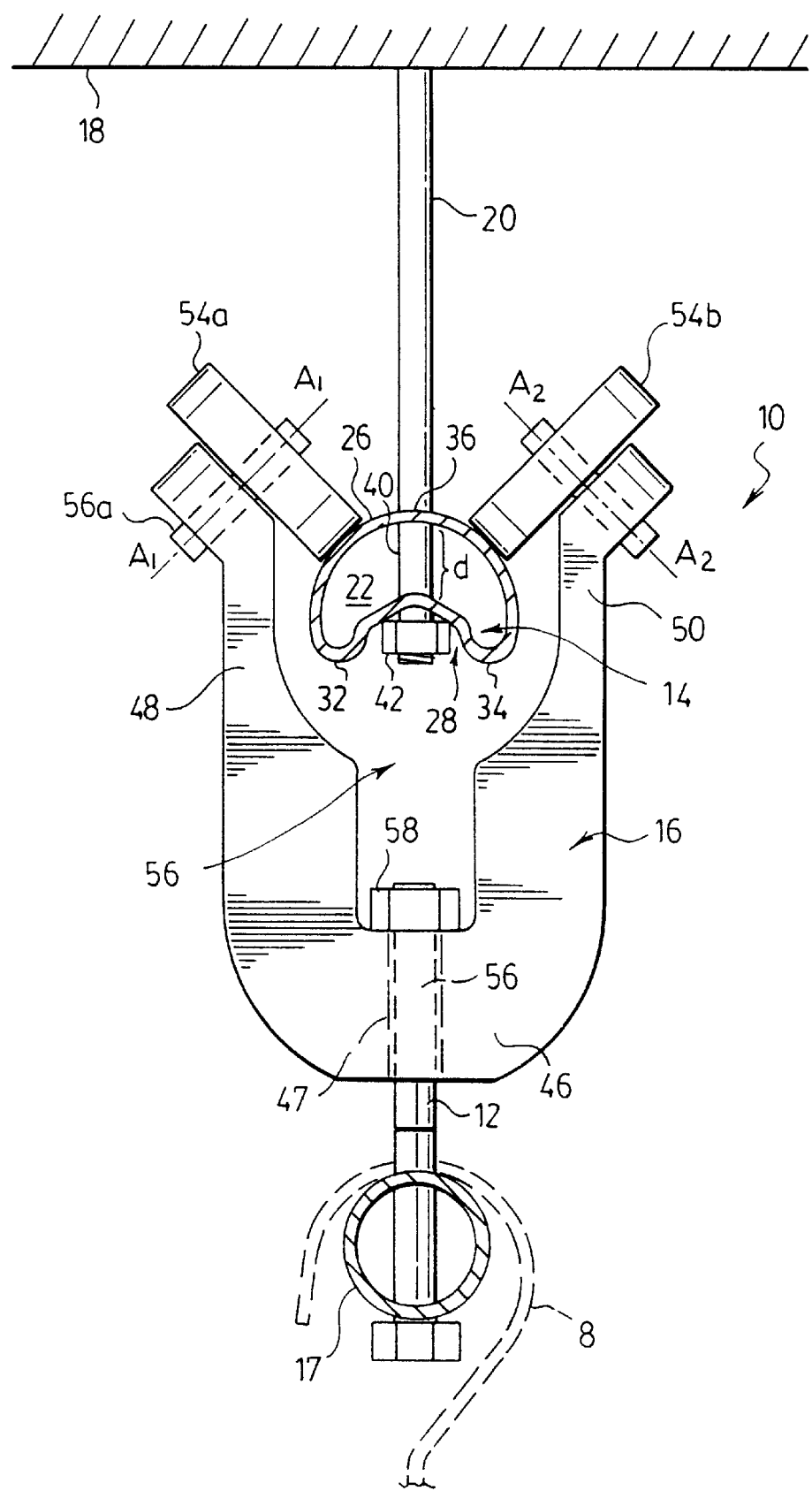
FIG. 1 is a schematic end view of a ceiling mounted conveyor system in accordance with a preferred embodiment of the invention.
Figure 2:
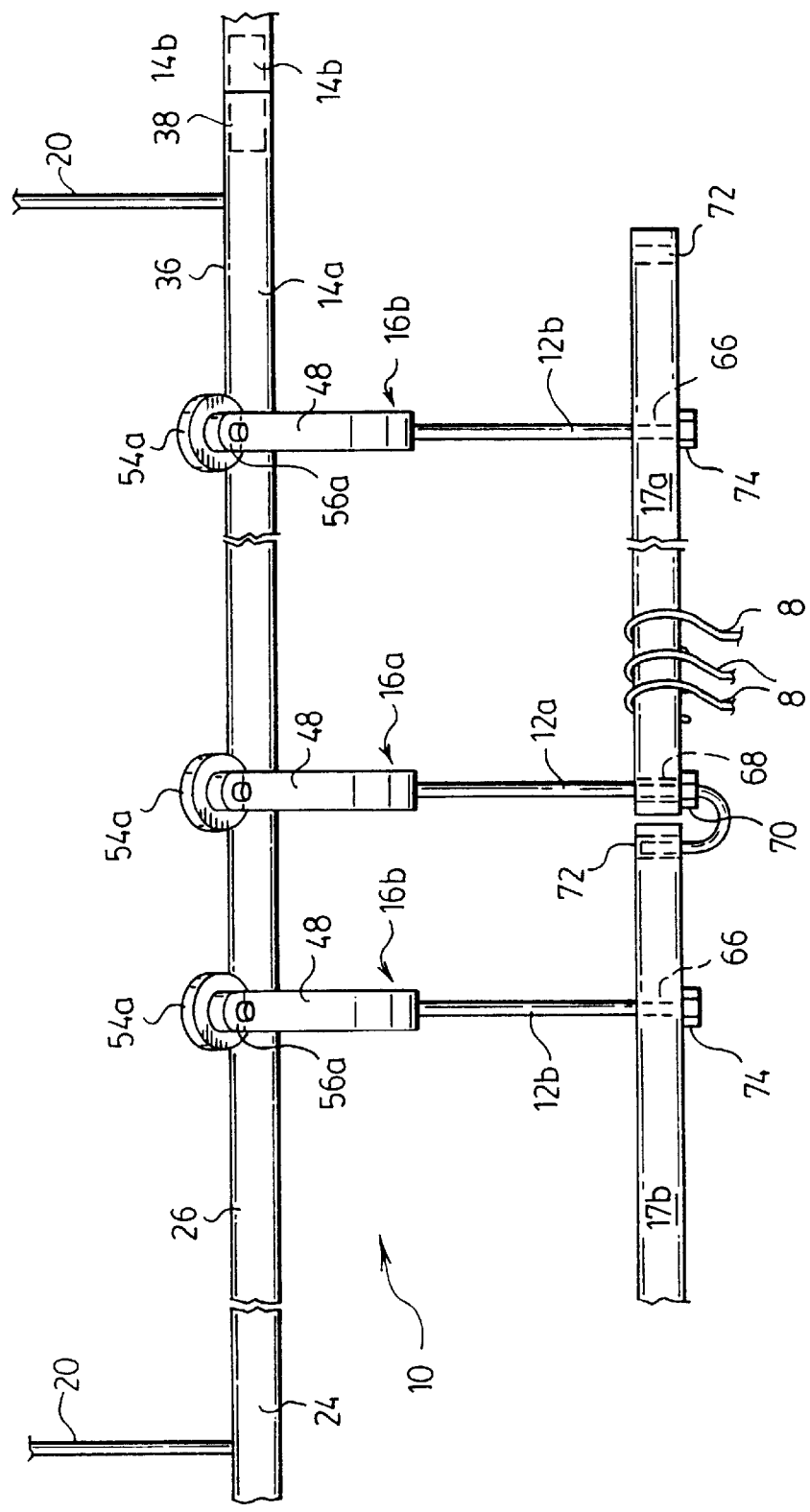
FIG. 2 is a partial schematic side view of the conveyor system shown in FIG. 1.

Reference is first made to FIGS. 1 and 2 which show a monorail-type conveyor system 10 used to convey garments on hangers 8 in an establishment in accordance with a preferred embodiment of the invention. The conveyor system 10 consists of a longitudinally extending track or rail 14, a number of trolley pendants 16 which are longitudinally movable along the rail 14, and a number of trolley bars 17 which are movably suspended from the trolley pendants 16 and which directly support the hangers 8.

The rail 14 is erected as a continuous loop and, as will be described hereafter, is suspended from a ceiling 18 by a number of spaced vertically extending support rods 20. The rail 14 is preferably formed from a steel or other rigid metal tube having a hollow interior 22 and a continuously extending sidewall 24. To provide the desired rigidity and strength, the thickness of the sidewall 24 is preferably selected at between about 0.5 and 3 mm and more preferably about 1 mm, however, thicker or thinner sidewalls could be used depending on the intended use of the conveyor system 10. FIG. 1 shows best the rail 14 being generally crescent shaped in cross-section, having an upwardly curved convex upper surface 26 and an upwardly curving concave lower surface 28. The upper surface 26 curves from bottom rail edges 32 and 34 upwardly as an arc of a circle to an uppermost crest 36 which defines the longitudinal upper center of the rail 14. Preferably the upper surface 26 extends between about 160° to 270°, and more preferably about 190°, with the rail 14 being substantially symmetrical about a vertical plane extending longitudinally along the uppermost crest 36.

The concave lower surface 28 is formed by crimping the lower edge of a cylindrical tube along its longitudinal length. In one preferred embodiment the rail 14 is formed by roll crimping the surface 28 during a continuous cold roll forming process. The lower surface 28 extends from the edges 32, 34 upwardly towards the crest 36, and is spaced from the upper surface 26 by a maximum distance d (FIG. 1). The use of a cylindrical tube to form the rail 14 further advantageously enables tubular sections to be bent into curves and coupled to the crimped rails 14 for corners, rises and drop runs in the conveyor system 10.

Where longer conveyor systems 10 are to be used, the continuous rail 14 is formed by linking together a number of like rail segments 14a, 14b (FIG. 2). In one simplified embodiment, rail segments 14a, 14b are joined by inserting a connector 38 which has a profile corresponding to the rail interior 22 into the adjacent open ends of the rails 14a, 14b. Other connectors, however, such as splines, rivets or tongue and grooved ends could also be used.

FIG. 1 shows best the manner of suspending the rail 14 from the ceiling 18. The rail 14 is secured in place by inserting the support rods 20 through a corresponding bore 40 formed vertically through the rail 14 at the crest 36. A nut 42 is then threaded onto the end of the support rod 20 to retain the rail 14 thereon.

FIG. 1 shows best a pair of trolley pendants 16 which movably support each end of a trolley bar 17 used to suspend and store garments (not shown) on hangers 8. It is to be appreciated that while FIGS. 1 and 2 illustrate a single trolley bar 17 and associated pendants 16 for clarity, in use a number of identical pairs trolley pendants 16 and trolley bars 17 would be provided as part of the conveyor system 10. The trolley pendant 16 is generally U-shaped and includes a body or bight 46 and two arms 48, 50 integrally formed from cast aluminum. A bore 47 (FIG. 1) formed through the center of the bight 46 is sized to receive therein a threaded upper end 56 of a keeper rod 12, which as will be described, is used to couple the trolley bar 17 to the trolley pendant 16. A nut 58 is provided in threaded engagement with the upper end 56 of the keeper rod 12 to releasably couple the rod 12 to the trolley pendant 16.

The arms 48, 50 are spaced apart and extend from the bight 46 parallel to each other so as to define a throat 52 therebetween. As shown best in FIG. 1, the throat 52 has a maximum lateral width greater than the maximum lateral width of the rail 14. Most preferably, the throat 52 at least partially defines a circular cavity having a diameter marginally greater than the maximum diameter of the rail 14. A Teflon™ bearing wheel 54a, 54b mounted on the end of each respective arm 48, 50 is configured for rolling engagement longitudinally along the upper surface 26 of the rail 14. Each of the wheels 54a, 54b are rotatable about a respective pivot shafts 56a, 56b. The pivot shaft 56a, 56b are centered on respective axis $A_1$, $A_2$ which are oriented substantially perpendicular to each. Most preferably, the axis $A_1$, $A_2$ are also substantially parallel to the portion of the upper surface 26 which is engaged by the periphery of the wheel 54a,54b.

The wheels 54a, 54b each have a radial diameter selected so as to project towards each other part way into the throat 52. The radial diameter of the wheels 54a, 54b is chosen so that the wheels 54a, 54b are spaced from each other by it minimum distance which is smaller than the lateral width of the rail 14, but greater than the maximum distance d separating the upper and lower rail surfaces 26, 28. The arms 48, 50 have a length having regard to the wheel diameter so that the throat 52 extends inwardly from the wheels 54a, 54b towards the bight 46, a distance which is greater than the lateral width of the rail 14. FIG. 1 shows best the trolley pendant 16 as being symmetrically formed about its center with the result that in use, each wheel 54a, 54b engages a portion of the upper surface 26 on one side of the crest 36, at locations spaced substantially an equal distance therefrom. As will be described, this configuration permits at least partial rotation of the rail 14 within the trolley throat 52 to move one of the wheels 54a, 54b past either the edge 32 or edge 34 of the rail 14.

FIGS. 1 and 2 show best the trolley bar 17 as consisting of a hollow steel tube. A bore 66, 68 is formed through the trolley bar 17 adjacent each of its opposite ends As seen best in FIG. 2, two different types of keeper rods 12a, 12b are provided for insertion through the bores 68, 66 to releasably secure the trolley bar 17 at each of its ends to an associated trolley pendant 16. A first keeper rod 12a used to secure one end of the bar 14 is formed having a J-hook configuration. The J-hook is sized for complimentary insertion through the bore 68 and includes a spacer or washer 70, which is engaged by the trolley bar 17a (FIG. 2) to maintain its correct position thereon. As shown in FIG. 2, the hooked end of the keeper rod 12a is sized for placement in a coupling engagement with a secondary end bore 72 which formed in an end portion of the immediate proximate end of the next adjacent trolley bar 17b. The second other keeper rod 12b is formed as a substantially straight rod having a threaded end. The rod 12b is sized for insertion through the bore 66 with the rod 17 coupled thereto by means of a bottom cap nut 7.1.

In use of the conveyor system 10, an individual trolley is formed by securing a trolley bar 17a at each end to its associated pair of trolley pendants 16a, 16b by inserting the keeper rods 12a, 12b through the respective bores 66, 68. Adjacent trolleys are coupled to each other by locating the hooked end of the J-shaped keeper rod 12a connected to one trolley pendant 16a, into the end bore 72 which is formed in the proximate end of the adjacent trolley rod 17b (FIG. 2). In this manner, moving one pair of trolley and its associated trolley rod 17, also results in the movement of each of the trolleys coupled thereto.

Where the rail 14 bends, the coupled trolley rod 17b may be separated from trolley rod 17 by lifting the rod 17b off the keeper rod 12, and the individual trolley rods 17 and their associated trolley pendant 16a, 16b independently moved along curve. Following the movement of each trolley bar 17 past the curve, adjacent trolley bars 17 are again linked to each other.

It has been found that by forming the rail 14 with a crescent shaped cross-sectional profile and a hollow interior 22, the rail 14 possesses lighter weight than bent steel rails and achieves a strength and stability surpassing that of conventional cylindrical shaped tracks. Further, as shown best in FIGS. 3 to 5, the concave lower surface 28 of the rail 14 permits 28 the trolley pendant 16 to be removed from the conveyor system 10 without requiring disassembly of the rail 14.

To remove a trolley pendant 16, the trolley pendant 16 is rolled longitudinally along the rail 14 to a position between the support rods 20. The keeper rod 12 is removed by unscrewing the nut 58 and the trolley pendant 16 is then pivoted about the rail 14 in the direction of arrow 60 shown in FIG. 3, to move the wheel 54a on arm 48 to a position beneath the lower edge 32 of the rail 14. As the wheel 54a moves past the edge 32, the lower edge 34 of the rail 14 moves in the throat 52 relatively towards the bight 46. Because the minimum spacing between the bearing wheels 54a, 54b is greater than the maximum distance of separating the upper and lower surfaces 26, 28, the trolley pendant 16 may then be moved laterally in the direction of arrow 62 (shown in FIG. 4) to move the wheel 54a into the recess defined by the concave lower surface 28. Once the wheel 54a is moved into the recess directly beneath the surface 28, the trolley pendant 16 may be rotated in direction of arrow 64, shown in FIG. 5, opposite to direction of arrow 60, to move the trolley 16 free of the rail 14 and the remainder of the conveyor system 10.

Figure 3:
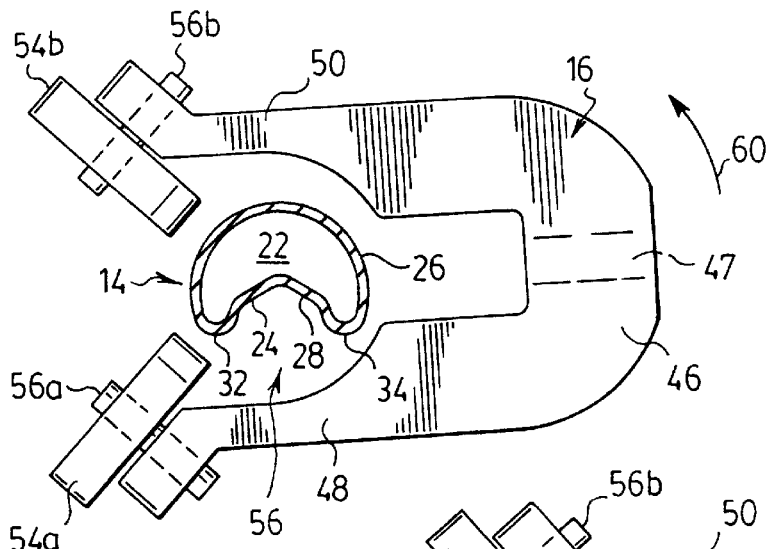
FIGS. 3 to 5 show a schematic partial end view of the conveyor rail and trolley pendant shown in FIG. 1, illustrating the manner of removing the trolley pendant from the conveyor rail.
Figure 4:
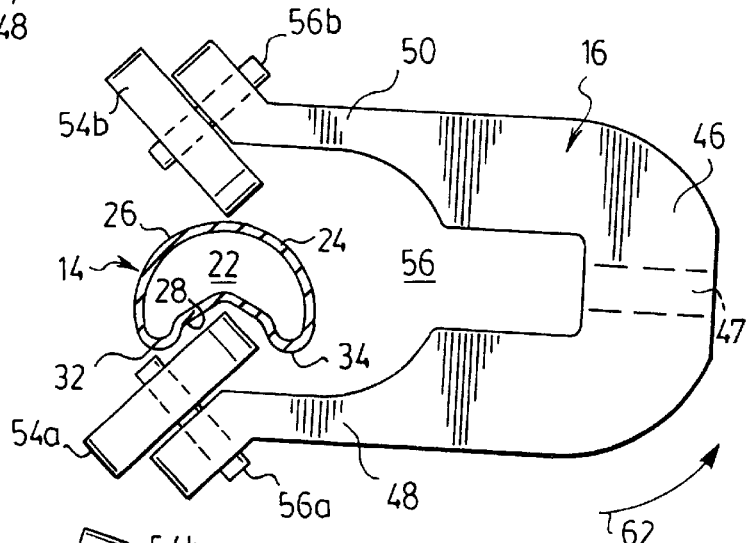
Figure 5:
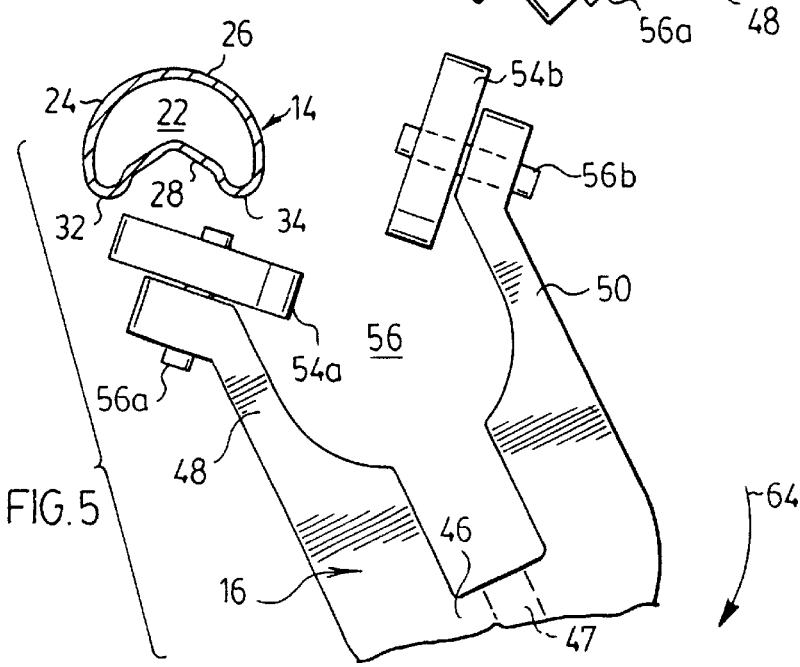

It is to be appreciated that trolley pendants 16 may be repositioned on the rail 14 in the opposite manner as they are removed as described with reference to FIGS. 3 to 5.

Although the preferred embodiment discloses a conveyor system 10 as being used in a ceiling mounted monorail configuration, the invention is not so limited. It is to be appreciated that the invention may be equally used in multiple rail systems which incorporate independently pivotable trolleys.

While the preferred embodiment discloses the use of a conveyor system 10 for installation as a dry cleaning garment conveyor system, the invention is not so limited. Other applications for the system are equally possible and will now become apparent, including by way of non-limiting examples, conveyor systems used to convey manufacturing components or other manufactured goods or livestock.

The preferred embodiment of the invention discloses the rail 14 as being formed from a 1 mm thick steel tube. Depending upon the intended use of the conveyor system rails having thicker or thinner wall thicknesses, and/or made from other metals or plastics may also be used without departing from the spirit and scope of the present invention.

Although the detailed description describes the invention as including a J-hook keeper rod 12a to couple the trolley bar 17a to an adjacent trolley bar 17b, other magnetic or mechanical coupling members could also be used.

While a rail 14 having a concave lower surface 28 may be preferred, the dimpled lower surface could also be formed having other cross-sectional profiles without departing from the spirit and scope of the invention.

Although the detailed description describes the trolley pendants 16 as supporting an elongated trolley bar 17 used to suspend garment hangers 8, the invention is not so limited. If desired the trolley pendants 16 could be used to support other goods or other garment supporting structures including hoops or even hangers themselves.

While the preferred embodiment of the invention discloses each trolley bar 17 as being individually supported at each of its ends by a respective trolley pendant 16a, 16b coupled thereto, the invention is not so limited. If desired, a single trolley pendant could be provided to both couple and support the proximate ends of adjacent trolley bars.

Although the detailed description describes and illustrates many preferred embodiments, the invention is not so limited. Many modifications and variations will now occur to persons skilled in the art. For a definition of the invention, reference may be had to the appended claims.

What is claimed is:

1. A conveyor system comprising:
   a longitudinally elongated rail and a pendant-type trolley member for movement along the rail,
   the rail being generally tubular and having an upwardly convex upper surface extending to an uppermost crest, and an upwardly concave lower surface spaced a distance from said upper surface,
   the trolley member comprising a body and a pair of spaced apart arm members extending upwardly from said body for placement along each side of said rail, each arm member including a bearing member for engaging said upper surface on opposite sides of the said crest to movably support the trolley member on said rail,
   wherein the trolley member is supported on the rail for movement longitudinally along the rail with the body below the rail, each arm member extending upwardly to above the track on a respective side of the rail and each bearing member engaging the upper surface of the rail with the trolley member substantially encircling the rail but for an open gap separating the bearing members by a minimum distance greater than a maximum distance the lower surface is spaced from the upper surface,
   wherein with the trolley member orientated so that one bearing member is adjacent the upper surface and the other bearing member is adjacent the lower surface, the rail passes through the gap to remove the trolley member from the rail or apply the trolley member to the rail.

2. A conveyor system as claimed in claim 1 wherein each said bearing members comprises a wheel configured for rolling engagement longitudinally along said upper surface.

3. A conveyor system as claimed in claim 1 wherein said rail is symmetrical about a vertical plane extending longitudinally along said uppermost crest.

4. A conveyor system as claimed in claim 1 further including an elongated trolley bar coupled to the trolley member for movement therewith.

5. A conveyor system as claimed in claim 1 comprising a plurality of trolley members, a plurality of elongated trolley bars wherein each one of said trolley members is coupled to an associated end portion of one of said trolley bars to move said trolley bar therewith.

6. A conveyor system as claimed in claim 5 wherein said trolley bar comprises a tubular bar.

7. A conveyor system as claimed in claim 1 wherein said rail comprises a metal tube having a wall thickness less than about 2 mm.

8. A conveyor system as claimed in claim 6 wherein said rail comprises a metal tube having a wall thickness less than about 2 mm.

9. A conveyor system as claimed in claim 4 further comprising a plurality of support members coupled to said rail, and extending vertically upward from said crest.

10. A ceiling mounted conveyor system comprising:
   a longitudinal elongated hollow track and at least one pair of trolley members for movement longitudinally along the track,
   the track having a generally upwardly convex upper surface extending to an uppermost crest, and an upwardly concave lower surface spaced a distance from said upper surface, with the track being symmetrical about a vertically extending plane extending longitudinally through said crest,
   each trolley member including a body adapted for suspension directly below said track and a pair of spaced apart arm members extending upwardly from said body for placement on each side of said track, each arm member including a bearing member for engaging said upper surface on opposite sides of the said crest to movably support the trolley member on said track, and
   wherein the trolley member is supported on the rail for movement longitudinally along the rail with the body below the rail, each arm member extending upwardly to above the track on a respective side of the rail and each bearing member engaging the upper surface of the rail with the trolley member substantially encircling the rail but for an open gap separating the bearing members by a minimum distance greater than a maximum distance the lower surface is spaced from the upper surface,
   wherein the trolley member is removable from the rail by passing the rail through the gap with the trolley member orientated so that one bearing member is adjacent the upper surface and the other bearing member is adjacent the lower surface,
   a plurality of vertical support members coupled to said track proximate said crest, said support members spaced along the length of the track to permit the trolley member to pass therebetween during removal from the track member or application thereonto.

11. A conveyor system as claimed in claim 10 wherein each said bearing member comprises a wheel configured for rolling engagement longitudinally along said upper surface.

12. A conveyor system as claimed in claim 11 wherein said trolley member comprises a garment conveyor.

13. A conveyor system as claimed in claim 10 wherein said track comprises a crimped metal tube having a wall thickness less than about 2 mm.

14. A conveyor system as claimed in claim 12 wherein said track comprises a crimped metal tube having a wall thickness less than about 2 mm.

15. A conveyor system as claimed in claim 10 comprising a plurality of trolley members, a plurality of elongated trolley bars wherein each one of said trolley members is coupled to an associated end portion of one of said trolley bars to move said trolley bar therewith.

16. A conveyor system comprising:
   a longitudinally elongated rail, said rail having an upwardly convex upper surface extending to an uppermost crest, and an upwardly concave lower surface spaced a distance from said upper surface,
   a pair of trolley pendants, each of said trolley pendants comprising a body and a pair of spaced apart arm members extending upwardly from said body for placement along each side of said rail, each arm member including a bearing member for engaging said upper surface on opposite sides of the said crest to movably support the trolley pendant on said track,
   wherein the trolley member is supported on the rail for movement longitudinally along the rail with the body below the rail, each arm member extending upwardly to above the track on a respective side of the rail and each bearing member engaging the upper surface of the rail with the trolley member substantially encircling the rail but for an open gap separating the bearing members by a minimum distance greater than a maximum distance the lower surface is spaced from the upper surface,
   wherein the trolley member is removable from the rail or applied thereonto because the gap, when the trolley member is orientated so that one bearing member is adjacent the upper surface and the other bearing member is adjacent the lower surface, has a width permitting the rail to pass therethrough,
   a first keeper member releasably coupled to a first one of said pair of trolley pendants,
   a second keeper member releasably coupled to the second other one of said pair of trolley pendants, and
   a trolley bar adapted for coupling with said first and second keeper members for associated movement with said pair of trolley pendants.

17. The conveyor system as claimed in claim 16 including a further plurality of said pairs of trolley pendants, each of said further pairs of trolley pendants being coupled to an associated trolley bar, one of said trolley bars including a secondary coupling aperture, wherein a first keeper member used to couple a trolley pendant to an adjacent trolley bar is configured to releasably engage the secondary coupling aperture and link said one trolley bar and said adjacent trolley bar.

18. A conveyor system as claimed in claim 16 wherein each said bearing members comprises a wheel configured for rolling engagement longitudinally along said upper surface.

19. A conveyor system as claimed in claim 17 wherein said track comprises a crimped metal tube having a wall thickness less than about 2 mm.

20. A conveyor system as claimed in claim 19 wherein said trolley member comprises a garment conveyor.

21. A method of removing a trolley member from a rail in a conveyor system comprising:
   a longitudinally elongated rail and a pendant-type trolley member for movement along the rail,
   the rail being generally tubular and having an upwardly convex upper surface extending to an uppermost crest, and an upwardly concave lower surface spaced a distance from said upper surface,
   the trolley member comprising a body and a pair of spaced apart arm members extending upwardly from said body for placement along each side of said rail, each arm member including a bearing member for engaging said upper surface on opposite sides of the said crest to movably support the trolley member on said rail,
   wherein the trolley member is supported on the rail for movement longitudinally along the rail with the body below the rail, each arm member extending upwardly to above the track on a respective side of the rail and each bearing member engaging the upper surface of the rail with the trolley member substantially encircling the rail but for an open gap separating the bearing members by a minimum distance greater than a maximum distance the lower surface is spaced from the upper surface, wherein with the trolley member orientated so that one bearing member is adjacent the upper surface and the other bearing member is adjacent the lower surface, the rail passes through the gap to remove the trolley member from the rail or apply the trolley member to the rail, the method comprising manipulating the trolley member to orient the trolley member relative the gap so that one bearing surface is adjacent the upper surface and the other bearing member is adjacent the lower surface such that the rail passes through the gap to remove the trolley member from the rail or apply the trolley member to the rail.

* * * * *